United States Patent [19]

Lydiksen

[11] 4,065,032
[45] Dec. 27, 1977

[54] CONTAINER-FILLING MACHINE WITH FILL ADJUSTMENT DURING OPERATION

[75] Inventor: George C. Lydiksen, Pleasanton, Calif.

[73] Assignee: Simplex Filler Company, Hayward, Calif.

[21] Appl. No.: 731,134

[22] Filed: Oct. 12, 1976

[51] Int. Cl.² .................... G01G 13/34; G01F 11/16
[52] U.S. Cl. ................................. 222/77; 74/89.15;
74/30; 141/83; 222/309
[58] Field of Search ............... 74/89.15, 424.8 R, 30;
222/309, 77

[56] References Cited

U.S. PATENT DOCUMENTS

| | | | |
|---|---|---|---|
| 3,580,302 | 5/1971 | Risenberg | 222/309 |
| 3,587,671 | 6/1971 | Gamberini | 222/309 |
| 3,666,142 | 5/1972 | Gust | 222/309 |
| 3,737,073 | 6/1973 | Lupert | 222/309 |

*Primary Examiner*—Samuel Scott
*Assistant Examiner*—Wesley S. Ratliff, Jr.
*Attorney, Agent, or Firm*—Phillips, Moore, Weissenberger, Lempio & Majestic

[57] ABSTRACT

A container-filling machine having a continuously rotating member with an orbiting drive cam thereon which causes reciprocatory piston movement of the piston filler. An adjustment shaft carried by and radially of the rotating member adjusts the radius of the drive cam orbit, and the length of the piston stroke, when the adjustment shaft is rotated about its axis. A toothed rack is movable into the path of a pinion gear fixed to the end of the adjustment shaft so that interengagement of the rack and gear causes adjustment of the radius of the drive cam orbit as the cam moves in such orbit.

12 Claims, 6 Drawing Figures

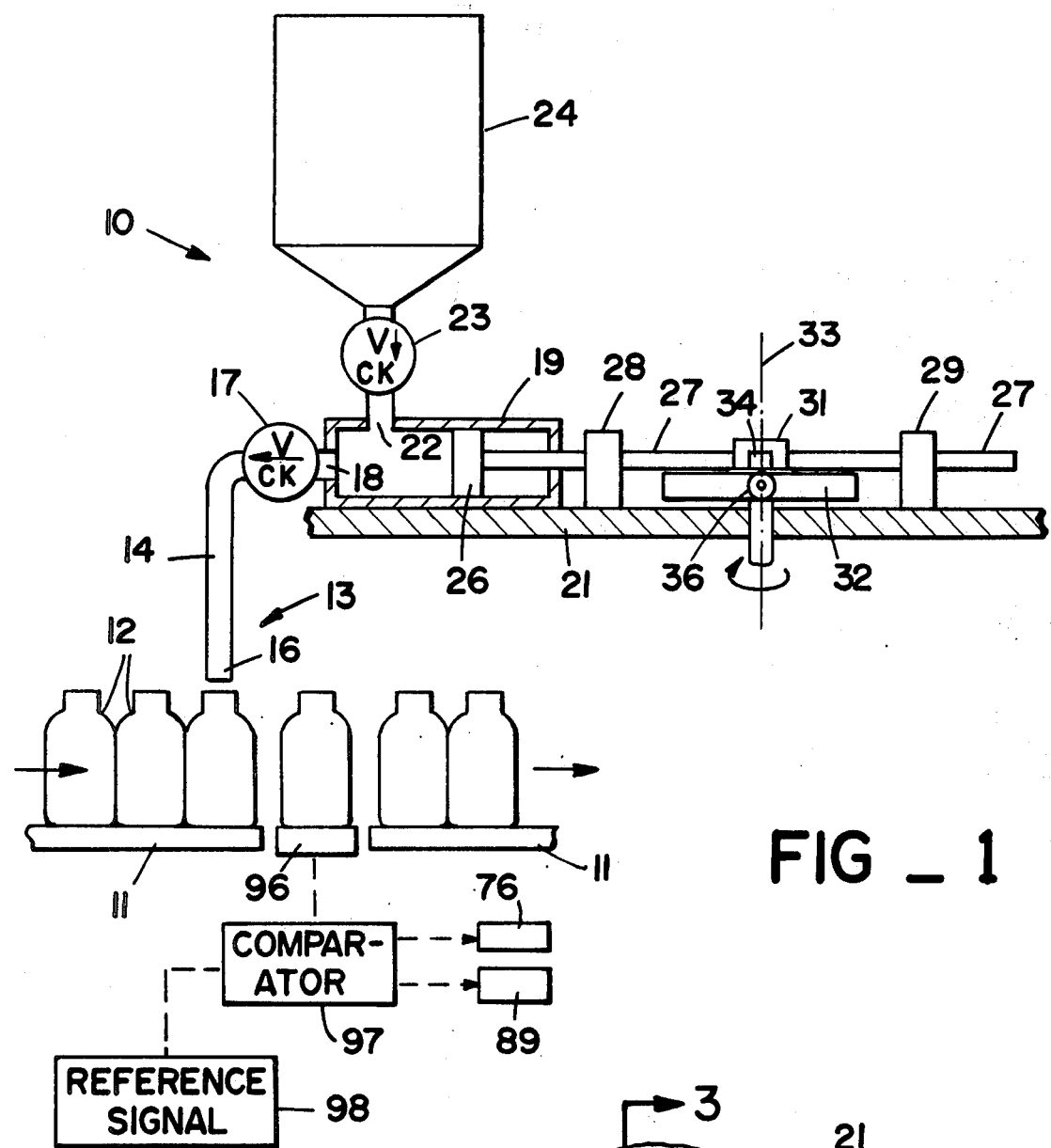
FIG _ 1
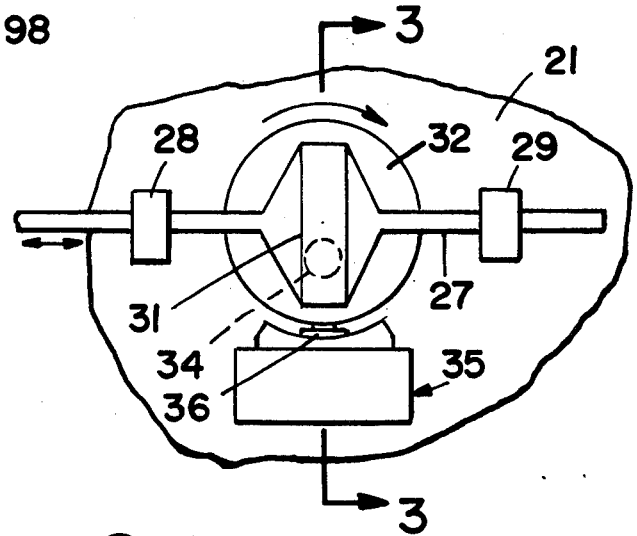
FIG _ 2

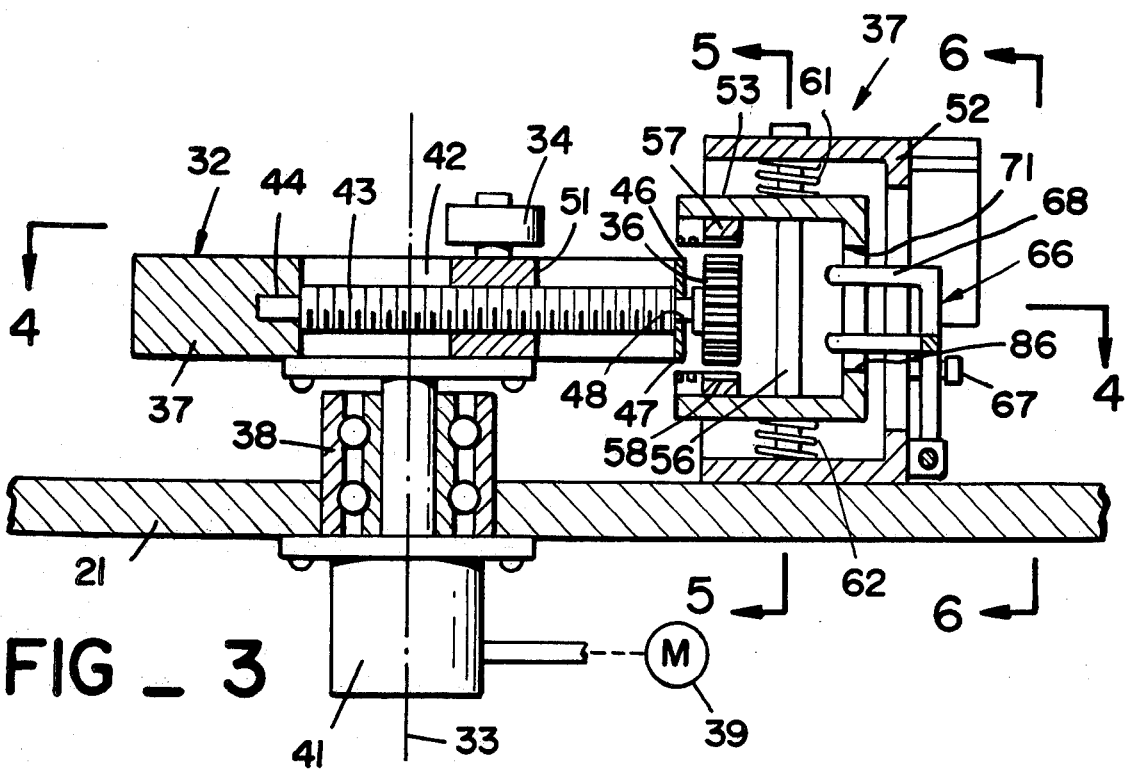
FIG_3
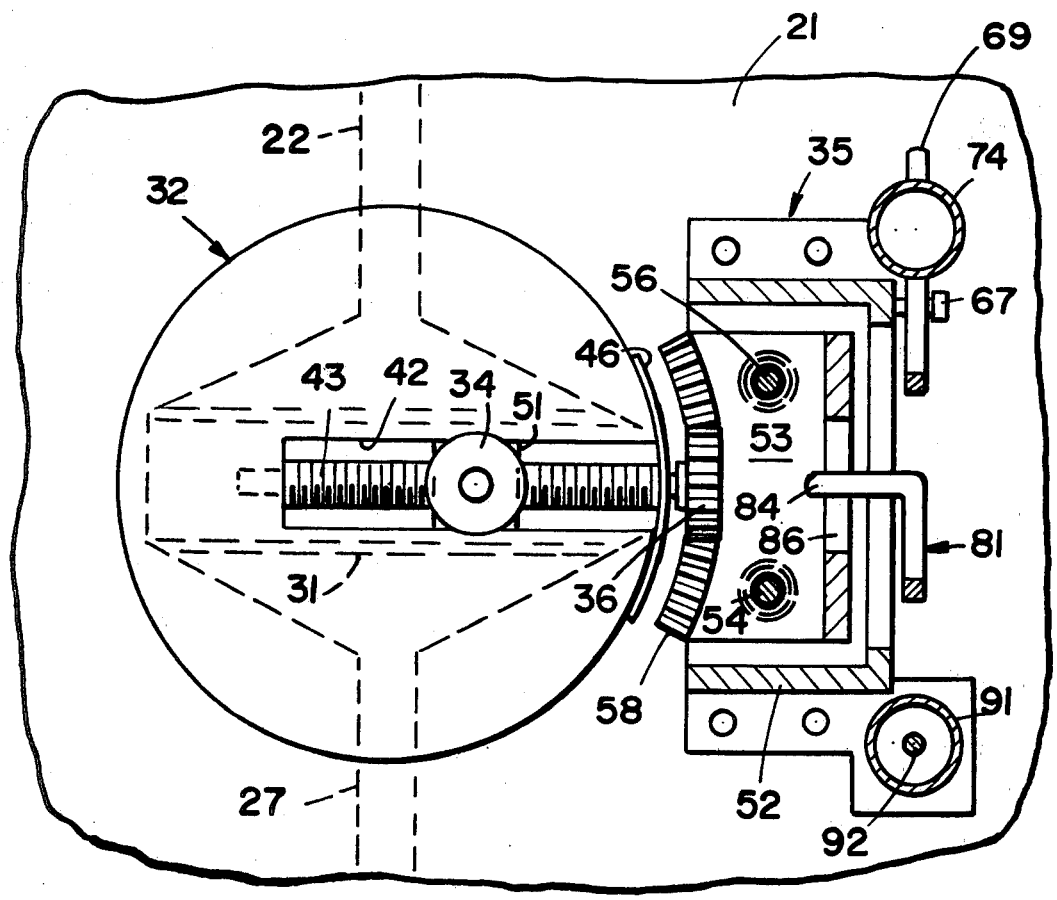
FIG_4

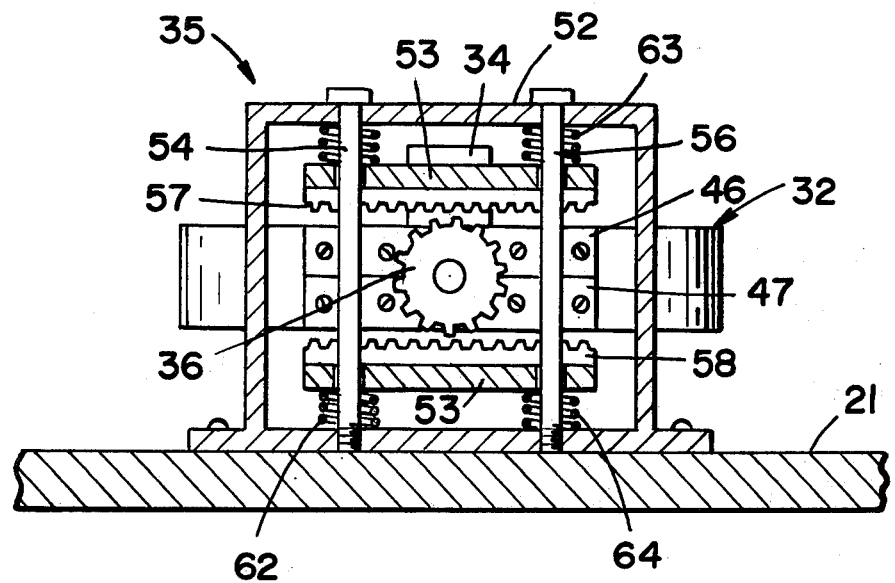
FIG _ 5
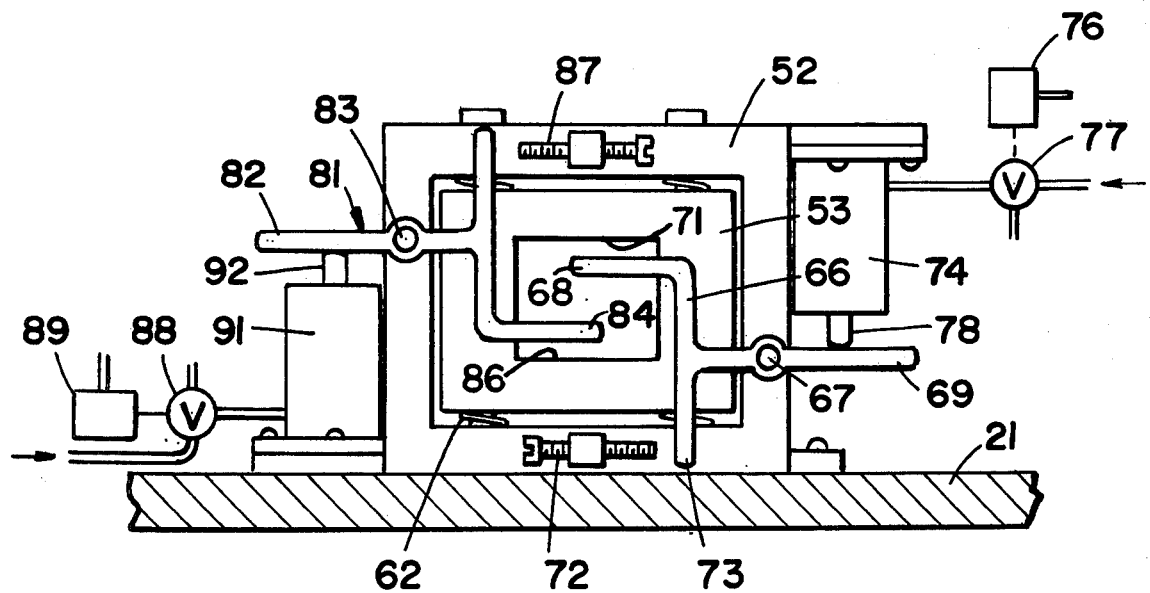
FIG _ 6

CONTAINER-FILLING MACHINE WITH FILL ADJUSTMENT DURING OPERATION

BACKGROUND OF THE INVENTION

This invention relates to container-filling machines, and particularly those utilizing a continuously reciprocating piston wherein a volume of material is filled into a container on each stroke of the piston, the volume being determined by the length of the stroke of the piston.

In setting up for filling operations, the machine will be turned off so that the drive mechanism for the piston will be at rest. The length of the piston stroke is adjusted, relative to the size of the container to be filled. Assuming the initial adjustment is correct, the machine is then turned on so that the piston is continuously reciprocated and a constant volume of material is discharged into the containers for each cycle of reciprocation of the piston. The drive mechanism for the piston is also connected with the conveyor mechanism so that the bringing of the containers to and taking them from the filling machine is synchronized with the piston operation.

It often occurs that the initial adjustment of the piston stroke, made while the machine is at rest, does not produce the desired volume when the machine is in operation. The stroke-adjustment mechanism moves with the piston and thus it is necessary to stop the machine so that the piston stroke can be readjusted. The machine is then put into operation again to see if the new adjustment is correct. If not, the process is repeated until it is. This initial adjustment procedure is undesirably cumbersome and time-consuming.

It also occurs that a particular batch of material being handled will vary in density during a filling run. For example, the material may be in a hopper or reservoir so that some settling will occur. As a consequence, the material may become progressively less dense as the hopper is depleted. With a constant volume being filled into each container, the weight per container will decrease as the run continues. If the weight per container decreases below the normal range of tolerance the machine must again be stopped and the piston stroke adjusted so that the weight per container is brought back to the desired amount.

It is a primary object of the present invention to provide an improved container-filling machine whereby the piston stroke can be adjusted during movement of the drive mechanism for the piston so that the machine need not be shut down for such purpose.

It is a further object of the invention to provide an improved container-filling machine whereby the piston stroke can be adjusted automatically, during a filling run, and in response to a variation of weight in the containers so as to maintain the desired weight per container — again without the necessity of having to stop operation of the machine.

SUMMARY OF THE INVENTION

The main object of the invention is accomplished by utilizing a roller cam which orbits around an axis, the cam being drivingly connected to the piston so that the orbital movement of the cam will produce reciprocatory movement of the piston, with the length of the stroke of the piston being dependent on the radius of the cam orbit. A threaded shaft disposed radially of the axis will, upon rotation of the shaft, move the cam towards or away from the axis.

A pinion gear is fixed to the end of the threaded shaft and moves through an orbital path and in a plane perpendicular to the axis. Two racks are provided, parallel to and one on each side of the plane of orbital movement of the pinion gear. The racks are normally biased away from such plane so that neither one will be engaged by the pinion gear as it orbits.

If it is desired to increase the piston stroke, the appropriate one of the racks is moved towards the plane so that it will engage the pinion gear during a portion of its orbital movement and cause the gear and shaft to rotate as the gear continues its orbital movement. This in turn moves the drive cam for the piston away from the axis of its orbital movement so that the piston stroke is increased. Each time the pinion gear orbits it will engage the rack and provide an incremental adjustment of the drive cam. When the piston stroke has been adjusted to the desired amount, the rack is moved away so that it will not intercept the pinion gear during continued orbital movement. The piston stroke can be decreased in the same manner using the other rack.

Automatic weight control can be achieved by weighing the container after filling and by moving one or the other rack into interception with the orbiting pinion gear depending on whether the weight should be increased or decreased.

BRIEF DESCRIPTION OF THE DRAWINGS

In the drawings, forming a part of this application and in which like parts are designated by like reference numerals throughout the same, FIG. 1 is a generally schematic illustration of a container-filling machine embodying the present invention, with the rack member mechanism thereof being deleted for purposes of illustration;

FIG. 2 is a plan view of the piston drive mechanism of the machine of FIG. 1 with the rack member mechanism being generally shown;

FIG. 3 is a sectional elevational view, taken on line 3—3 of FIG. 2, illustrating the details of the present invention;

FIGS. 4, 5 and 6 are sectional views illustrating details of the present invention and taken on lines 4—4, 5—5, and 6—6 of FIG. 3.

DESCRIPTION OF THE PREFERRED EMBODIMENT

Referring now to the drawings, and in particular to FIG. 1, such figure illustrates a container-filling machine 10 having a conveyor 11 for moving open-topped containers 12 to a filling station 13 at the machine. A filler tube 14 is disposed at the filling station, with its discharge end 16 in vertical alignment with the container, the filler tube being connected through check valve 17 to the outlet 18 of cylinder 19 which is mounted in fixed relation to frame 21 of the machine. The inlet 22 cylinder is connected through check valve 23 to a material reservoir 24. A reciprocable piston 26 is disposed in the cylinder and operates therein so that when the piston is moved to the right, material from reservoir 24 will be drawn through check valve 23 into the cylinder. Leftward movement of the piston then discharges the material through check valve 17 and through filler tube 14 into the container.

The drive means for the piston includes a piston rod 27 journaled for reciprocating movement in bearings 28 and 29, the rod having a transversely extending cam follower 31 integral therewith.

A rotatable member 32 is mounted on the frame for rotation about a fixed vertical axis 33, so that the roller cam 34 thereon will move through an orbital path around the fixed vertical axis. The cam follower 31 embraces the roller cam 34 so that orbital movement of cam 34 will drive follower 31 and produce reciprocating movement of piston 26. The length of the stroke of piston 26, and the quantity of material discharged from cylinder 19 for each stroke of the piston is directly related to the radius of the cam orbit, i.e., the distance that cam 34 is offset from vertical axis 33.

The machine 10 further includes a pinion gear 36 and rack member means 35 for adjusting the stroke of piston 26 as more specifically shown in FIGS. 3–6.

Referring now to these drawings, rotatable member 32 comprises, for example, a circular disc 37 mounted in bearing 38 for rotation about the fixed axis 33, disc 37 being driven by motor 39 through gearbox 41. Motor 39 also drives, by convention means not shown, conveyor 11 so that movement of the containers 12 to and away from the filling station is synchronized with the operation of piston 26.

Disc 37 has a slot 42 extending radially of axis 33, in which is disposed a screw-threaded shaft 43 having the axis thereof in a plane perpendicular to axis 33. One end 44 of shaft 43 is of reduced diameter and fits into a complementary shaped socket in disc 37. The other end of shaft 43 is held in place by keeper plates 46 and 47 which are secured to the disc and extend into circumferential groove 48 in shaft 43 so that shaft 43 may rotate about its axis while being restrained against endwise movement.

A follower block 51 is threaded on shaft 43 and engages the walls of slot 42 so that as shaft 43 is rotated, block 51 will be translated along the slot to move cam 34 thereon towards or away from axis 33, depending on the direction of rotation of the shaft.

Pinion gear 36 is fixed on the end of the shaft, coaxially therewith, the gear being outward of the periphery of disc 37. As the disc 37 rotates, gear 36 will move through an orbital path about axis 33 and in the horizontal plane in which the axis of shaft 43 lies.

The rack member means 35 includes a housing member 52 mounted on frame 21 and having an open side facing disc 37. A C-shaped rack-holder 53 is disposed within housing 52 and is slidably mounted on vertical guide rods 54 and 56 which confine the holder to vertical movement only within the housing.

Holder 53 has fixed thereto first and second arcuate rack members 57 and 58, each having gear teeth thereon complementary to the teeth of pinion gear 36, the rack members being parallel to and spaced on opposite sides of the plane of orbital movement of the pinion gear. The curvature of the rack members is substantially at axis 33. The rack members 57 and 58 are spaced from each other by an amount sufficiently greater than the diameter of pinion gear 36 so that both racks can be simultaneously out of engagement with the pinion gear. Compression springs 61, 62, 63 and 64 are confined between the housing 52 and the rack-holder 53 and yieldably bias the rack-holder 53 so that it is centered in the position shown in FIG. 3 wherein both racks are disengaged from pinion gear 36.

Various mechanisms can be provided to move rack-holder 53 up or down. For example, housing member 52 has a lever 66 pivotally mounted thereon at 67, the lever having one end 68 bent inwardly to project through an opening in the vertical wall of rack-holder 53. The lever 66 has its opposite end 69 extending outwardly of the housing so that the lever 66 may be manually operated. If end 69 is pressed downwardly, lever end 68 will move upwardly, engage the upper edge 71 of the opening through the rear wall of rack-holder 53 and then move the holder upwardly against the bias of springs 61 and 63 so that the lower rack 58 can be engaged by pinion 36. A set screw 72 is provided in the path of lever extension 73 to limit the upward movement of rack 58. Release of lever end 69 will allow springs 61 and 63 to return the rack-holder 53 to its central, disengaged position.

A power operator, such as air cylinder 74 mounted on housing 52, is also provided for actuation of lever 66. When solenoid 76 is energized, valve 77 is opened to allow air from a suitable source of air under pressure to flow to cylinder 74 so that the piston rod 78 will move downwardly and engage lever arm 69 so that rack-holder 73 is moved upwardly. De-energization of solenoid 76 causes valve 77 to exhaust cylinder 74 so that piston 78 may retract, allowing springs 61 and 63 to return rack-holder 53 to its centered position.

A similar lever 81 is provided so that rack-holder 53 may be moved downwardly. As lever arm 82 is moved upwardly, the lever will pivot at 83 so that lever end 84 will engage opening edge 86 and move the rack-holder 53 downwardly against the bias of springs 62 and 64 to bring the upper rack 57 into engagement with pinion gear 36. Set screw 87 limits such rack movement. Valve 88, controlled by solenoid operator 89, admits pressurized air to cylinder 91 so that piston 92 can cause the upper rack 57 to move downwardly.

Solenoids 76 and 78 are connected to a suitable source of electrical energy by a spring-centered switch 93 which may be located on the control panel of the machine.

OPERATION

In operation of the apparatus thus far described, the motor 39 will have been turned on so that the rotatable member 36 is driven continuously so that containers 12 are brought by conveyor 11 to the filling station 13 to be filled. Each revolution of member 32 and its cam roller 34 will cause piston 26 to reciprocate, drawing a measured amount of material from reservoir 24 to be drawn into cylinder 19 and then discharged from the cylinder into the container.

If during operation it is desired to adjust the piston stroke to increase the amount of material that is to be discharged into the container on each stroke, lever arm 69 of lever 66 is moved downwardly (either manually or by use of air cylinder 74) to move rack-holder 53 upwardly so that the lower rack 58 is moved into the orbital path of pinion gear 36. Preferably this is done at a time when gear 36 is away from the rack.

When gear 36 reaches rack 58, the teeth on the lower side of the gear will interengage with the rack teeth, so that gear 36 will be rotated in a counterclockwise direction (when viewed as in FIG. 5). If shaft 43 has a right-hand thread, rotation of the shaft will cause the slider block 51 thereon to move inwardly, carrying the cam roller 34 towards axis 33. The stroke of piston 26 is thus decreased in length.

By a suitable correlation of the number of teeth on gear 36 and rack 58, the length of the rack 58, the pitch of the thread on shaft 43 and the diameter of piston 26, a predetermined increment of change in volume of material handled by cylinder 19 for each stroke of piston 26 will result for each full engagement of tear 36 with rack 58. If it is desired to decrease the volume of material handled by this increment, then lever 66 is released after a single traverse of the rack 58 by gear 36 so that the rack-holder is moved back to its central position.

If it is desired to decrease the fill by a multiple of the increment, rack 58 is maintained in its upper position so that each time gear 36 orbits, it engages rack 58 and moves cam roller 34 inwardly. When cam roller 34 has reached its desired position, rack 58 is released for downward movement so that it will not engage gear 36 on subsequent orbiting movement thereof.

In like manner, the fill can be increased by a predetermined increment or multiple thereof by moving rack 57 into position to be engaged by gear 36, so that gear 36 and shaft 43 will be rotated in the opposite direction.

Thus, by use of the present invention, the amount of fill can be easily increased or decreased by predetermined increments during operation of the machine and without having to shut down operations so that the adjustment can be made.

The present invention further makes it simple to obtain an automatic regulation of the weight in containers 12 during operation, in case the density of the filling material should change.

As seen in FIG. 1, after a container 12 has been filled, it is moved onto scale 96. By conventional electronic means, a signal proportional to the actual weight of the contents of container 12 is generated and transmitted to comparator 97 where the actual weight signal is compared to a reference signal from source 98, the latter signal being proportional to the desired weight. If the actual weight signal from scale 96 deviates in a positive direction from the reference signal by more than a predetermined amount, i.e., the fill is excessive, comparator 97 produces a signal to energize solenoid 76 so that rack 58 is moved into position to intercept gear 36 during one orbital revolution thereof, and thereby cause a decrease in the length of stroke of piston 26. Similarly, if the weight signal from scale 97 deviates in a negative direction, comparator 97 causes solenoid 89 to be energized for a single orbital revolution of gear 36.

The amount of deviation from the reference weight required to energize one or the other of solenoids 76 or 89 is less than the permissible amount of deviation and thus the weight filled into the container will be automatically maintained within the permissible tolerance.

What is claimed is:

1. In a container-filling machine having a conveyor for moving an open-topped container to and away from a filling station, a filler tube at said filling station for filling said container, a reservoir of material to be filled into said container, a cylinder having an inlet connected to said reservoir and an outlet connected to said filler tube, means including a reciprocable piston in said cylinder for drawing material into said cylinder from said reservoir upon movement of said piston in one direction and for discharging said material from said cylinder to said filler tube upon opposite movement of said piston, a rotatable member mounted on the frame of said machine, means for rotating said member about a fixed axis, said member having a cam thereon offset from said axis and movable with said member through an orbital path around said axis, and means for reciprocating said piston in response to orbital movement of said cam, the improvement comprising:

said rotatable member having a slot therein extending radially of said axis,
a screw-threaded shaft having its axis in a plane perpendicular to the axis of said rotatable member,
means mounting said shaft in said slot for permitting rotation of said shaft about its axis while restraining said shaft against endwise movement relative to said slot,
a follower block threaded on said shaft and riding in said slot for translatory movement along said slot in response to rotation of said shaft,
said cam being mounted on said follower block,
a pinion gear fixed to said shaft coaxially therewith, said gear being movable through an orbital path in said plane upon rotation of said rotatable member about its axis,
an arcuate rack member disposed parallel to said orbital path of said pinion gear and spaced from one side of said plane of movement of said pinion gear,
housing means on said frame mounting said rack member for movement towards and away from said plane of orbital movement of said pinion gear,
means for moving said rack member towards and away from said plane and into and out of meshing engagement with said pinion gear.

2. In a container-filling machine as set forth in claim 1, the improvement further comprising:
means yieldably biasing said rack member away from said plane and out of engagement with said pinion gear.

3. In a container-filling machine as set forth in claim 2, wherein said means for moving said rack member includes a manually operable member for moving said rack member against the bias thereon.

4. In a container-filling machine as set forth in claim 2, wherein said means for said rack member includes a remotely controllable power-operated member for moving said rack member against the bias thereon.

5. In a container-filling machine as set forth in claim 3, the improvement further comprising:
means for measuring the weight of the material filled into said container and comparing said weight with a reference weight,
and means responsive to a predetermined degree of deviation in the weight of the material filled into said container from said reference weight for actuating said power means to move said rack member into meshing engagement with said pinion gear.

6. In a container-filling machine as set forth in claim 1, the improvement further comprising:
a second arcuate rack member parallel to the first rack member and disposed on the other side of said plane of orbital movement of said pinion gear,
said second rack member being mounted in said housing means for movement towards and away from said plane,
means for moving said second rack member towards and away from said plane and into and out of meshing engagement with said pinion gear.

7. In a container-filling machine as set forth in claim 6, wherein said means for moving said first rack member includes a first remotely controllable power-operated member for moving said first rack member into engagement with said pinion gear and wherein said means for moving said second rack member includes a second remotely controllable power-operated member for moving said second rack member into engagement with said pinion gear.

8. In a container-filling machine as set forth in claim 7, the improvement further comprising:
means for measuring the weight of the material filled into said container and comparing said weight with a reference weight,
means responsive to a predetermined positive deviation in the weight of the material in said container from said reference weight for actuating said first power-operated member and responsive to a predetermined negative deviation in the weight of the material in said container from said reference weight for actuating said second power-operated member.

9. In a container-filling machine as set forth in claim 6, the improvement further comprising:
means yieldably biasing both of said first and second rack members away from said plane and out of engagement with said pinion gear.

10. In a container-filling machine as set forth in claim 6, the improvement further comprising:
holder means securing said first and second rack members together for unitary movement thereof, with said first and second rack members being spaced apart by an amount sufficiently greater than the diameter of said pinion gear that both of said rack members may simultaneously be out of meshing engagement with said pinion gear,
guide means engaging said housing means and said holder means for confining said holder means against movement other than parallel to the axis of said rotatable member,
means engaging said housing means and said holder means for yieldably biasing both of said first and second rack members out of engagement with said pinion gear.

11. In a container-filling machine as set forth in claim 10, wherein said means for moving said first rack member includes a first power-operated member for moving said first rack member against the bias thereon and into engagement with said pinion gear wherein said means for moving said second rack member includes a second power-operated member for moving said second rack member against the bias thereon and into engagement with said pinion gear.

12. In a container-filling machine as set forth in claim 11, the improvement further comprising:
means for measuring the weight of the material filled into said container and comparing said weight with a reference weight,
means responsive to a predetermined positive deviation in the weight of the material in said container from said reference weight for actuating said first power-operated member and responsive to a predetermined negative deviation in the weight of the material in said container from said reference weight for actuating said second power-operated member.

* * * * *